United States Patent [19]

Flynn et al.

[11] 3,859,166
[45] Jan. 7, 1975

[54] COMBINED STORAGE TANK AND SUMP FOR NUCLEAR REACTOR

[75] Inventors: Edward Paul Flynn, Windsor, Conn.; Arthur Carter Rogers, Phoenix, Ariz.

[73] Assignee: Combustion Engineering, Inc., Windsor, Conn.

[22] Filed: Dec. 1, 1972

[21] Appl. No.: 311,185

[52] U.S. Cl. .................... 176/38, 176/65, 176/50
[51] Int. Cl. ..................... G21c 15/18, G21c 13/10
[58] Field of Search ........................ 176/38, 65, 50

[56] References Cited
UNITED STATES PATENTS

| | | | |
|---|---|---|---|
| 3,379,613 | 4/1968 | Tagami et al. | 176/38 X |
| 3,454,466 | 7/1969 | Pitt et al. | 176/38 |
| 3,649,451 | 3/1972 | Yedidia et al. | 176/38 |
| 3,660,229 | 5/1972 | Klingbeil et al. | 176/65 X |
| 3,702,281 | 11/1972 | Birts et al. | 176/38 |
| 3,718,539 | 2/1973 | West et al. | 176/38 X |

*Primary Examiner*—Benjamin R. Padgett
*Assistant Examiner*—Roger S. Gaither
*Attorney, Agent, or Firm*—John R. Nelson

[57] ABSTRACT

A combined coolant storage tank and sump located within the containment structure which surrounds and isolates the nuclear reactor. The combined tank and sump provides a means for storing a supply of emergency coolant for use in cooling the nuclear core of the reactor in the event of a loss of coolant accident in the primary coolant circulating loop and also provides a means for accumulating any coolant fluid discharged into the containment atmosphere. Conduit means flow couple the combined tank and sump and the nuclear reactor, and drive means are provided for driving the emergency coolant from the combined tank and sump into the nuclear reactor in the event of an emergency requiring injection of the coolant into the nuclear reactor. Also the combined tank and sump provides a means for relieving the pressure in the secondary side of the heat exchanger and in the pressurizer.

2 Claims, 2 Drawing Figures

COMBINED STORAGE TANK AND SUMP FOR NUCLEAR REACTOR

BACKGROUND OF THE INVENTION

The present invention relates to nuclear reactors and more particularly to an improved emergency core cooling system for such reactors.

In the event of an accident in which there is a break in the reactor coolant system, it has been postulated that the entire coolant medium which absorbs and removes the heat generated in the nuclear core will be lost or at least considerably decreased. Although control elements are inserted into the core upon the occurrence of such an accident to terminate the fission process, decay heat, generated by the already formed fission products, is capable of causing fuel or clad melting if sufficient cooling is not supplied to the fuel. Furthermore, the overheating of the fuel cladding can result in a severe chemical reaction with its environment which may not be reversed by later cooling procedures. Accordingly, it is necessary to immediately provide a sufficient coolant flow through the nuclear core to insure that this overheating of the fuel and cladding does not occur.

To accomplish this purpose conventional emergency core cooling systems have generally relied upon a passive injection system, usually located inside the containment structure housing the reactor, and a large coolant storage tank and standby pumping system located outside of the containment structure. In the event of a loss of coolant accident the passive injection system will immediately inject coolant fluid into the reactor to cool the nuclear core therein while the standby pumping system is being activated. Once activated, the standby pumping system will provide a continuous injection of coolant fluid into the nuclear core from the large coolant storage tank. A sump is normally provided within the containment structure for accumulating the primary coolant fluid spilled out through the break in the reactor coolant system and also for accumulating emergency coolant which has been injected into the nuclear reactor and also spilled out through the break. Since it is postulated that the cooling of the core will necessarily take a long time (usually a couple of days at a minimum), when the storage tank coolant level becomes low the suction of the standby pumping system is switched to the containment sump to thus provide a continuous injection of emergency coolant into the nuclear core.

SUMMARY OF THE INVENTION

As herein described there is provided a novel arrangement for an emergency core coolant system of a nuclear reactor. In a conventional nuclear reactor system having a nuclear reactor and at least one primary coolant flow loop housed within a containment structure, the novel emergency core cooling system comprises a combined coolant storage tank and sump located within the containment structure, conduit means and drive means. The combined coolant storage tank and sump within the containment structure provides storage for a supply of emergency coolant and also provides for accumulation of any coolant fluid discharged into the containment atmosphere. The conduit means flow couples the combined tank and sump and the nuclear reactor, and the drives means provides a driving force to drive the emergency coolant from the combined tank and sump into the nuclear reactor in the event of a loss of coolant accident.

Such an arrangement provides numerous advantages over the conventional arrangement of a separate coolant storage tank located outside the containment structure and a separate containment sump located inside the containment structure. Among these advantages are the following: a reduction in the required amount of piping and the elimination of several large valves heretofore necessary with a conventional arrangement; elimination of the switching signal necessary to switch the suction of the standby pumping system from the refueling water tank to the containment sump; and elimination of rapid temperature transients experienced within the emergency core cooling system when swtiching suction of the pumping system from the refueling water tank (which contains relatively cool water) to the containment sump (which contains relatively hot water). These and other advantages will be discussed hereinafter in the description of the preferred embodiment.

DESCRIPTION OF THE PREFERRED EMBODIMENT

Figure 1:
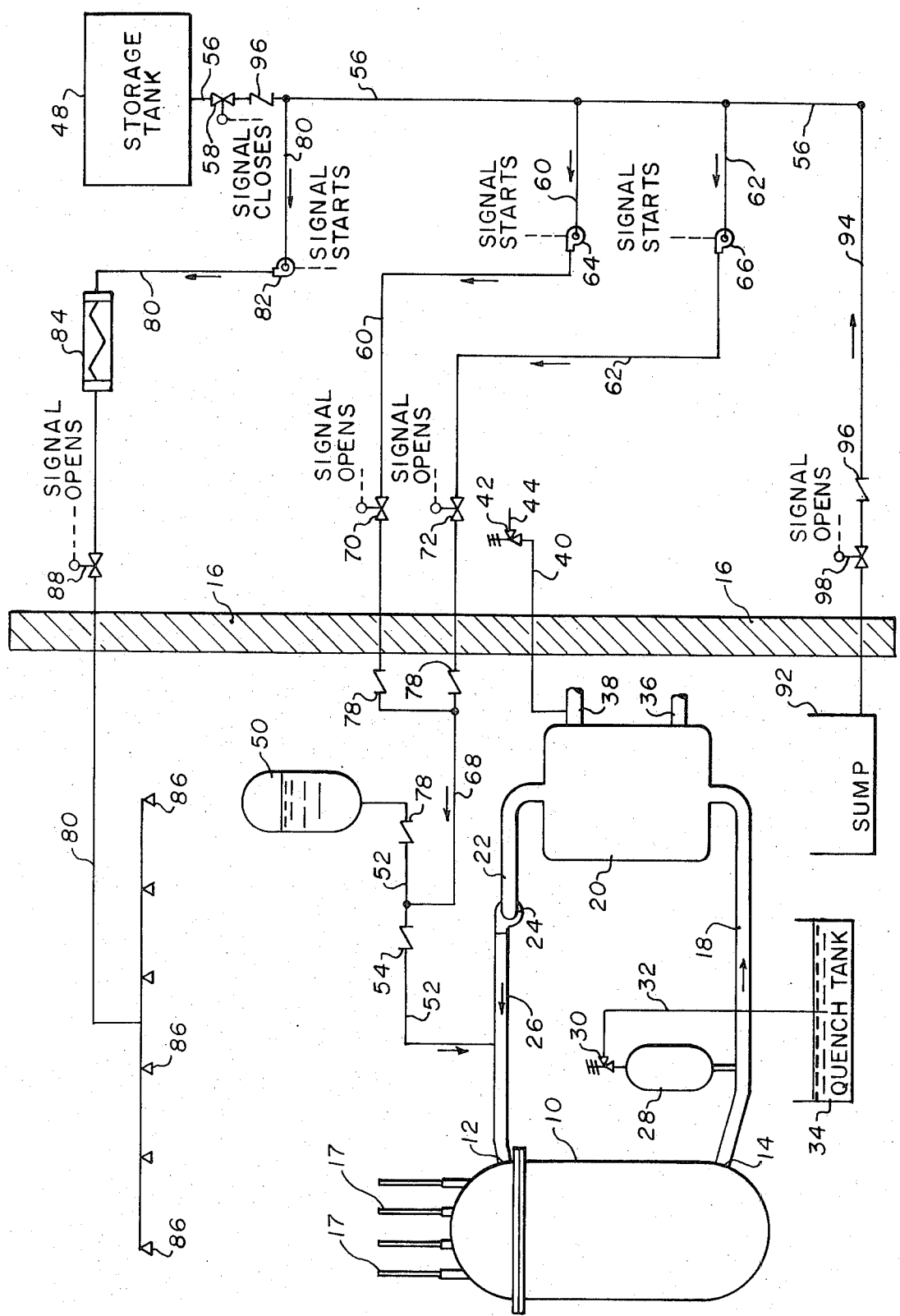
FIG. 1 shows a schematic diagram of a reactor system utilizing the prior art arrangement for an emergency core cooling system.

Referring now to the drawings, FIG. 1 shows schematically a nuclear steam supply system employing a conventional emergency core cooling system. Generally there is provided a nuclear reactor vessel 10 housed and completely contained within a containment structure 16 which is represented in FIG. 1 as a wall separating and isolating the nuclear steam supply system from the outside environment. The nuclear reactor vessel 10 has a primary coolant inlet opening 12 and a primary coolant outlet opening 14 formed integrally with and through its cylindrical walls. As is known in the art the vessel 10 contains a nuclear core (not shown) which generates substantial amounts of heat depending upon the position in operation of a control means. Generally the control means consists of control rods 17 operable automatically and manually from outside the reactor. The control rods 17 are comprised of a neutron absorbing material which is well known in the art and which is capable of controlling and shutting down the nuclear reaction in the core. The heat generated by the reactor core is conveyed from the core to the primary reactor coolant fluid which enters the reactor through the inlet means 12 and exits through the outlet means 14. The heated coolant fluid then flows via conduit 18 to a heat exchange unit or steam generator 20. The primary coolant fluid after flowing through the steam generator 20 is returned to the reactor 10 via conduits 22 and 26 which complete a closed primary coolant flow loop. The primary coolant pump 24 is provided to induce and control the flow of the reactor coolant through the nuclear reactor system and is interposed between the conduit means 22 and 26.

A pressurizer 28 is provided in fluid communication with the coolant in the conduit 18 in order to maintain the reactor coolant system operating pressure at a desired level and to help compensate for changes in the reactor coolant volume during load changes of the reactor 10. The pressurizer 28 is of the general type which controls the system operating pressure by maintaining steam and water in thermal equilibrium at the desired operating level. Overpressure protection of the reactor vessel 10 and coolant piping 18, 22, 26 on the primary side is provided by safety valve 30. If the pressure exceeds an acceptable level, steam is released from the pressurizer 28 by the safety valve 30 through discharge line 32 into a quench tank 34 which cools and condenses the discharge from the pressurizer 28 thus preventing release of steam into the atmosphere within the containment structure 16.

The heat exchange unit or steam generator 20 is of the general type wherein the heated primary coolant fluid is conveyed through means (not shown) which are in heat exchange relationship with water which is utilized to produce steam. The secondary water is introduced into the steam generator 20 through inlet line 36 and the steam exits from the steam generator 20 through exit line 38 where it is then conveyed to a turbine (not shown) for the production of electricity. Overpressure protection in the secondary side of the nuclear steam supply system is provided by safety valve 42 placed in a vent line 40 outside the containment structure 16, the vent line 40 being coupled to the steam exit line 38 inside the containment structure 16 and passing through the containment structure wall to the outside atmosphere. Steam is released from valve 42 in the event of overpressurization to the outside atmosphere through discharge line 44.

Also shown in FIG. 1 is a conventional emergency core cooling system for cooling the nuclear core in the event of a loss of coolant accident, such as a break in the primary reactor coolant loop. In the event of such an accident, two things usually happen as the coolant leaves the reactor vessel: there is a drastic decrease in pressure in the primary coolant loop and there is a significant increase in pressure (due to steam being generated in the nuclear core and released to the containment atmosphere) within the containment structure 16. Upon the detection of either of these two events the emergency core cooling system is actuated.

The conventional emergency core cooling system relies upon the injection of a large quantity of coolant fluid (usually water) into the nuclear core to cool the nuclear core and remove the heat generated therein. To this end there is provided a coolant storage tank 48 and standby pumping system 64, 66 for driving coolant from the tank 48 into the nuclear reactor vessel 10. Since there is a critical time delay in actuating the pumping system 64, 66 to bring it up to full operation, a completely passive safety injection system is normally provided. By passive it is meant that no electrical signal, operator action or outside power source is required for the system to function. As is well known in the art and as depicted in FIG. 1, such a system may comprise a tank 50 containing emergency coolant under pressure for injection into the reactor vessel 10 through a discharge line 52 coupled to the primary conduit 26. In the event of an accident in which the coolant is lost from the core, the coolant pressure in the primary coolant loop decreases. When it decreases to a value below that of the coolant under pressure in the tank 50, a check valve 54 in the discharge line 52 opens to allow the emergency coolant in the tank 50 to be injected into the reactor vessel. The check valve 54 is normally closed by the high pressure of the primary coolant acting against it. The amount of coolant in the tank 50 is sufficient to keep the core cool while the pumping system 64, 66 is being brought to full operation to drive coolant from the coolant storage tank 48 into the reactor 10.

The pumping system 64, 66 allows for two modes of injection of coolant from the coolant storage tank 48 into the reactor 10: a low pressure injection to provide injection of large quantities of water to the core and a high pressure injection to maintain a water cover over the entire core for extended periods of time. This high pressure injection is necessary since the decay heat generated in the core is sufficient to produce large quantities of steam within the reactor vessel 10 which might otherwise tend to block coolant from reaching the nuclear core. The low pressure system comprises a low pressure pump 64 interposed in a low pressure conduit 60 which is connected to the discharge conduit 56 of the coolant storage tank 48 and which passes through the wall of the containment structure 16. Inside the containment structure 16, the low pressure conduit 60 is flow coupled to an injection conduit 68 which in turn is flow coupled to the discharge line 52 of the safety injection tank 50. A low pressure safety injection valve 70 is positioned in the conduit 60 outside of the containment structure 16. In the event of a loss of coolant accident, an injection signal is generated in any well-known manner which causes the pump 64 to start and the valve 70 to open to allow coolant from the storage tank 48 to be injected into the reactor vessel 10 via primary coolant conduit 26. The high pressure injection system is similar to the low pressure injection system in that it comprises a high pressure pump 66 interposed in a high pressure conduit 62, the conduit 62 being connected to the discharge line 56 of the storage tank 48 and passing through the wall of the containment structure 16 to be flow coupled to the injection conduit 68. Also, a high pressure injection valve 72 is provided in the conduit 62 outside of the containment structure. Furthermore, the high pressure pump 66 is actuated and the valve 72 is opened by an injection signal similar to that for the low pressure system to inject coolant from the storage tank 48 into the reactor 10. Check valves 78 are provided inside of the containment structure 16 in lines 60, 62 and 52 in order to prevent a backflow of emergency coolant through these lines.

The emergency core coolant system is also provided with a containment spray system to help condense steam which is released into the containment atmosphere and thereby reduce the pressure experienced therein. The containment spray system comprises a pump 82 interposed in a containment spray conduit 80 which is flow coupled to the discharge line 56 of the coolant supply tank 48 and which passes through the wall of the containment structure 16. Inside the containment, the line 80 is connected to a series of spray nozzles 86 where coolant delivered thereto is discharged into the containment atmosphere to condense any steam therein. A heat exchanger 84 is interposed in the conduit 80 outside of the containment structure 16 and downstream of the pump 82 to cool the coolant passing therethrough. This will provide for better heat removal characteristics of the coolant discharged into the containment atmosphere. As with the low and high pressure systems, a containment spray valve 88 is provided in the conduit 80 outside of the containment structure 16. The valve 88 is opened and the pump 82 started by a containment spray signal which is generated in a well-known manner if the pressure of the containment atmosphere rises past an acceptable level.

As is apparent, large quantities of water are required for efficient operation of this system. Also, it is necessary that the system be capable of operating for long periods of time. Accordingly, in order to reduce the size of the equipment necessary (in particular, the size of the coolant storage tank 48) a containment sump 92 is provided inside of the containment structure 16 to accumulate any water which is discharged therein. This accumulation may include accumulation of primary coolant released from the reactor 10 through the break in the coolant loop, accumulation of injected coolant released through the break, and accumulation of the coolant resulting from condensation of steam released to the containment atmosphere. When the water level in the refueling water tank 48 reaches a low level, a recirculation activation signal is generated which acts to close the isolation valve 58 in the discharge line 56 of the storage tank 48 and open the isolation valve 98 in the discharge line 94 connected to the containment sump 92. The line 94 passes outside through the wall of the containment structure 16 and is in fluid communication with the discharge line 56 and thus the conduits 60, 62 and 80, to thereby allow the pumps 64, 66 and 82 to have their suction switched to the containment sump 92 to allow a recirculation of coolant. Check valves 96 in lines 56 and 94 are provided to allow for testing of the isolation valves 58 and 98 without experiencing a backflow of coolant fluid between the refueling water tank 48 and the containment sump 92.

Figure 2:
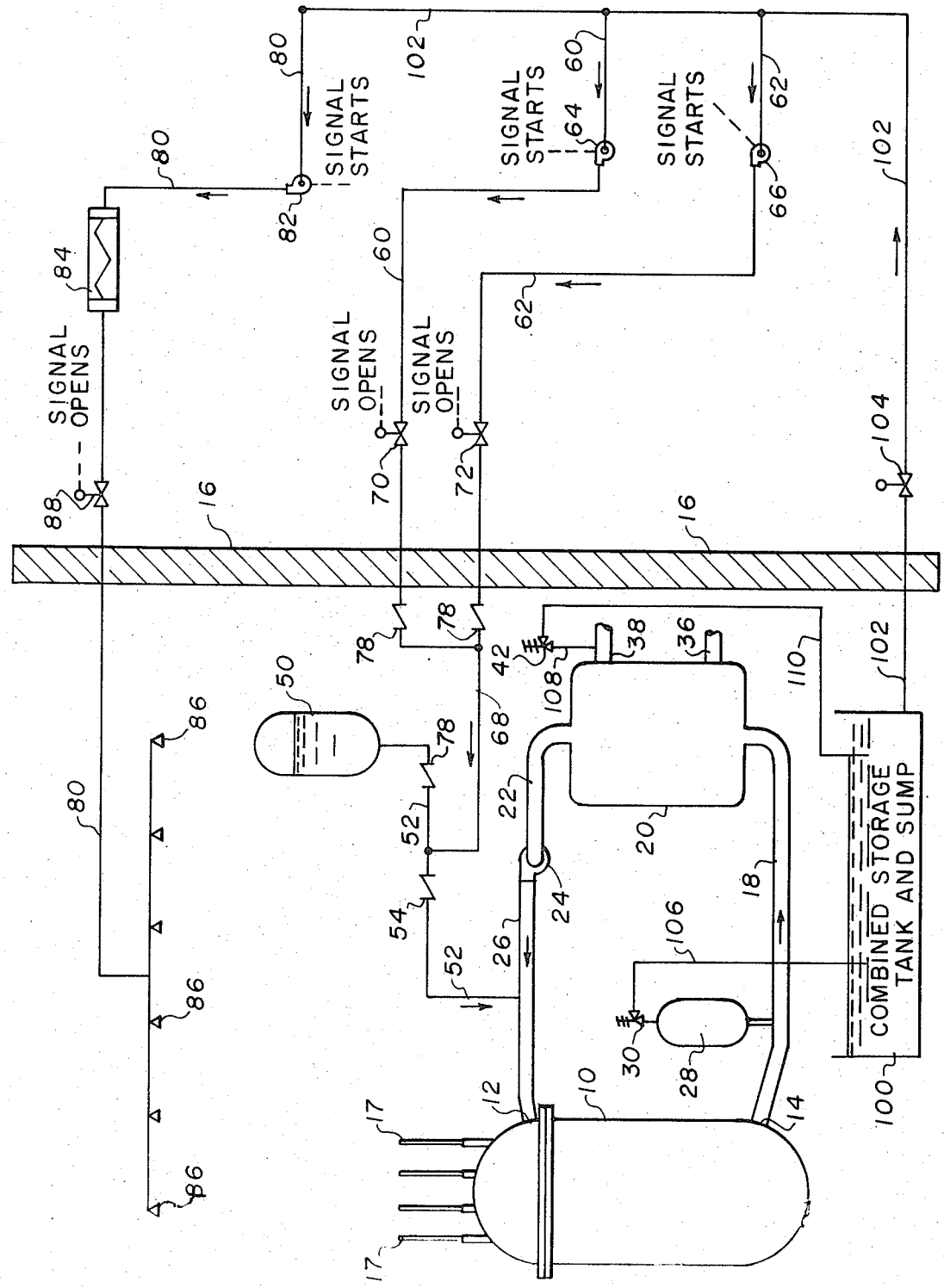
FIG. 2 shows a schematic diagram similar to FIG. 1 which illustrates the novel arrangement for the emergency core cooling system of the present invention.

The proposal of the present invention, as depicted in FIG. 2, is to provide a combined coolant storage tank and containment sump 100 which is positioned inside of the containment structure 16. The combined tank and sump 100 replaces and serves the functions of the separate coolant storage tank 48 and the separate containment sump 92 of the prior art emergency core cooling system. As seen in FIG. 2 the combined tank and sump 100 is substantially larger than the prior art sump 92 shown in FIG. 1 since the combined tank and sump must now serve to hold the emergency coolant fluid previously held by the coolant storage tank 48. A conduit 102 is coupled to the combined tank and sump 100 inside the containment structure 16 and passes outwardly through the wall therof to the exterior of the containment structure. A normally open, manually operated valve 104 is positioned in the conduit 102 outside of the containment structure 16 to isolate the combined tank and sump for testing. Outside of the containment structure 16, the conduit line 102 is connected to the conduit lines 60, 62 and 80 to provide emergency core coolant to the low pressure pump 64, the high pressure pump 66 and the containment spray pump 82. As with the prior art system, the low pressure conduit 60 and the high pressure conduit 62 both pass through to the interior of the containment structure 16 and are flow coupled to the injection conduit 68. Inside the containment structure 16 there is provided an identical passive injection system comprising a tank 50 having therein a supply of emergency core coolant under pressure and a discharge line 52 communicating with the primary fluid conduit 26. Additionally, the injection conduit 68 is connected to the discharge line 52 to provide an injection path for the emergency coolant in the combined tank and sump 100. A check valve 54 in line 52 allows injection of the coolant into the reactor vessel 10 when the primary coolant pressure falls below that of the coolant in the lines 52 and 68. Also, a plurality of check valves 78 are provided in the conduit lines 60, 62 and 52 inside the containment structure to prevent backflow of emergency core coolant through these lines and a low pressure and high pressure valves 70, 72 are provided in the lines 60 and 62 to permit injection of coolant into the vessel 10. Also, as with the prior art system, the containment spray conduit 80, which has a heat exchanger 84 and containment spray valve 88 interposed therein passes into the interior of the containment structure 16 and is coupled to the spray nozzles 86 to provide emergency core coolant fluid thereto. In the event of a loss of coolant accident calling for injection of emergency coolant into the reactor vessel 10, the operation of the system is the same as the prior art. When the pressure of the primary coolant drops, the passive injection system injects coolant into the primary line and a plurality of signals are generated to open the valves 70, 72 and start the low and high pressure pumps 64, 66. Emergency core coolant fluid is then taken from the combined coolant storage tank and sump 100 and injected into the reactor vessel through conduits 102, 60 and 62, 68 and 52. If the pressure inside the containment structure 16 becomes too great, another signal is generated to open the containment spray valve 88 and start the containment spray pump 82 to spray coolant into the containment atmosphere to condense the steam and lower the pressure therein as with the prior art system.

Other changes which can be incorporated into such a system as shown in FIG. 2 are the elimination of the prior art quench tank 34 (see FIG. 1) and the elimination of releasing overpressure in the secondary side of the steam generator 20 to the outside atmosphere through discharge line 44 (see FIG. 1). Instead overpressure from the pressurizer 28 is released from the safety relief valve 30 through a discharge line 106 into the combined storage water tank and sump 100. With regard to the secondary side overpressure problem, a vent line 108 is coupled to the steam outlet line 38 and has positioned therein, inside the containment structure 16, a safety relief valve 42. A discharge line 110 connected to the safety release valve 42 discharges steam released therefrom into the combined coolant storage tank and sump 100.

Such an emergency core cooling system as shown in FIG. 2 and as described hereinabove serves all the functions of the prior art system shown in FIG. 1 and provides, in addition to this, several economic and safety advantages. First there is the economic advantage in reducing the amount of required piping or conduit lines and in eliminating several large valves, in particular, the remotely actuated valves 58 and 98 and the check valves 96 of the prior art system. Against this all that is needed to be added is a normally opened, manually operable valve 104. Also with such a system, the recirculation activation signal is eliminated since it is no longer necessary to switch suction of the pumping systems 64, 66 and 82 from one tank to another.

With the prior art system in which the coolant storage tank 48 is located outside of the containment structure 16, the temperature of the coolant therein is usually from 40–70°F while the temperature of the coolant inside the sump rises to about 300°F in the event of an accident. To aid in reducing the temperature inside the containment structure 16 and also to provide for better heat transfer and heat removal, the heat exchanger 84 is provided to reduce the temperature of the incoming coolant during recirculation of coolant fluid from the sump 92. Accordingly, in a switchover from the storage refueling tank 48 to the sump 92, the pumping systems 64, 66 and 82 and the heat exchanger 84 experience a rapid temperature transient. As can be appreciated this is very harmful to both the pumping systems and the heat exchanger. However, this problem is alleviated with the emergency core cooling system of the present invention because the emergency core coolant fluid is always drawn from inside the containment structure 16 wherein it experiences a much more gradual temperature change.

Also, in the event of a loss of coolant accident the pressure within the containment atmosphere is significantly higher than atmospheric pressure. With the prior art system the pressure in the refueling tank is at essentially atmospheric pressure and accordingly, it is necessary to develop a specific driving head by the containment spray pumping system 82 in order to insure that the coolant fluid leaving through the spray nozzles 90 is injected into the containment atmosphere. This increases the necessary power requirement for operating the pumps 64, 66 and 82. With use of the present novel emergency core cooling system, however, this difference in pressure between that which is acting on the coolant fluid and that which is within the containment atmosphere is eliminated since the pressure which is in the containment atmosphere is exactly that which is acting on the coolant fluid contained in the combined storage tank and sump 100. Accordingly, the use of the present system aids in reducing the required discharge head developed by the containment spray pumping system 82 and also results in a reduction of the standby power requirements for operating the pumping systems 64, 66 and 82.

Furthermore, economic and safety advantages can be realized by having the discharge lines 106 and 110 from the safety valves 30 and 42 respectively discharging into the combined storage tank and sump 100. With respect to the primary side protection, it should be readily apparent that with use of the present system there is no longer a requirement for a separate quench tank 34 (see FIG. 1) inside the containment structure 16. This affords a substantial economic savings. With respect to secondary side protection, any radioactive contaminents contained in the primary coolant fluid and which enter the secondary system via possible leakage between the primary and secondary sides within the steam generator 20 will be kept inside the containment structure 16 and not be released to the outside atmosphere. This affords an additional safety feature not heretofore realized with the prior art emergency core coolant system.

Finally, it should be noted that with the use of the present invention it is not necessarily required that the conduit 102, which is coupled to the combined water tank and sump 100. pass outside of the containment structure 102. Instead all the required piping and pumping systems of the emergency core cooling system could be placed within the containment structure 16 if the pumps and piping were designed to withstand the atmospheric conditions experienced within the containment at structure 16, i.e., if they were designed for high temperatures (of the order of 300°F) and for 100 percent moisture content.

Accordingly, it can be seen that the novel and improved emergency core coolant system in which there is provided a combined water tank and sump 100 located within the containment structure 16, provides numerous advantages and additional safety features not heretofore experienced with the prior art systems.

While the preferred embodiment of the invention has been shown and described, it will be understood that such showing is merely illustrative rather than restrictive and that changes in the construction thereof may be made without departing from the spirit and scope of the invention as claimed.

What is claimed is:

1. A nuclear reactor system comprising:
   a closed containment structure providing a containment atmosphere therewithin;
   a reactor vessel within said containment structure having a nuclear core therein, a coolant inlet opening and a coolant outlet opening;
   primary coolant conducting means coupled to said inlet and outlet opening for providing a closed primary fluid circulating loop;
   a coolant pump for said circulating loop interposed in said primary conducting means;
   a combined storage tank and sump within said containment structure for storing a supply of emergency coolant and for accumulating any coolant fluid discharged into said containment atmosphere;
   conduit means for conducting coolant from said combined storage tank and sump to said primary coolant conducting means;
   means for driving the emergency coolant from said tank into said primary coolant conducting means in the event of a loss of coolant accident in said reactor system;
   a heat exchange means interposed in said primary coolant conducting means between said outlet opening in said reactor vessel and said coolant pump, said heat exchange means having secondary coolant conducting means in heat exchange relationship with said primary coolant conducting means;
   a vent line coupled to said secondary coolant conducting means;
   a pressure relief safety valve interposed in said vent line within said containment structure for releasing fluid in said secondary coolant conducting means in order to lower the pressure therein;
   a discharge line connected to said pressure relief safety valve and in fluid communication with said combined storage tank and sump for discharging released fluid from said safety valve thereinto;
   a pressurizer for controlling the pressure of the coolant in said primary coolant conducting means;
   a second pressure relief safety valve coupled to said pressurizer for releasing fluid contained therein in order to lower the pressure in said primary coolant conducting means; and
   a second discharge line connected to said second safety valve and in fluid communication with said combined storage tank and sump for discharging released fluid from said second safety valve thereinto.

2. The system of claim 1 wherein said conduit means has a portion thereof positioned outside of said containment structure, the ends of said conduit means being connected to said combined storage tank and sump and said primary coolant conducting means inside of said containment structure; and wherein said drive means comprises a standby pumping system interposed in said portion of said conduit means positioned outside of said containment structure.

* * * * *